US011075023B2

(12) United States Patent
Wolfinger et al.

(10) Patent No.: US 11,075,023 B2
(45) Date of Patent: Jul. 27, 2021

(54) INSULATION ELEMENT WITH ARTIFICIAL FIBRES FOR ELECTRICAL INSULATION IN THE HIGH VOLTAGE RANGE

(71) Applicant: Weidmann Holding AG, Rapperswil (CH)

(72) Inventors: Tobias Wolfinger, Uznach (CH); Wolfgang Exner, St. Gallenkappel (CH); Stefan Jaufer, Rüti (CH)

(73) Assignee: Weidmann Holding AG, Rapperswil (CH)

( * ) Notice: Subject to any disclaimer, the term of this patent is extended or adjusted under 35 U.S.C. 154(b) by 50 days.

(21) Appl. No.: 16/327,709

(22) PCT Filed: Jul. 27, 2017

(86) PCT No.: PCT/EP2017/068998
§ 371 (c)(1),
(2) Date: Feb. 22, 2019

(87) PCT Pub. No.: WO2018/036747
PCT Pub. Date: Mar. 1, 2018

(65) Prior Publication Data
US 2019/0198192 A1    Jun. 27, 2019

(30) Foreign Application Priority Data
Aug. 23, 2016  (EP) ..................... 16185233

(51) Int. Cl.
*H01B 3/00*      (2006.01)
*H01B 3/30*      (2006.01)
(Continued)

(52) U.S. Cl.
CPC ................ *H01B 3/004* (2013.01); *C08L 3/04* (2013.01); *C08L 79/02* (2013.01); *H01B 3/20* (2013.01);
(Continued)

(58) Field of Classification Search
None
See application file for complete search history.

(56) References Cited

U.S. PATENT DOCUMENTS 7,718,252 B2 * 5/2010 Ito ...................... C04B 35/6316
428/309.9
2010/0090176 A1 * 4/2010 Kosowsky ............... H01B 1/22
252/511
(Continued)

FOREIGN PATENT DOCUMENTS

DE            29 34 007 A1    3/1980
DE    10 2010 041 630 A1     3/2012
(Continued)

OTHER PUBLICATIONS

International Preliminary Report on Patentability of PCT/EP2017/068998 dated Feb. 26, 2019.
(Continued)

*Primary Examiner* — Katie L. Hammer
(74) *Attorney, Agent, or Firm* — Sughrue Mion, PLLC

(57) ABSTRACT

The invention relates to an insulation element (1) with low electrical conductivity for the electrical insulation of an electrotechnical component in the high voltage range. The insulation element (1) comprises artificial fibres (2) and electrically conductive particles (3) having an electrically non-conductive core (5) and an electrically conductive or semi-conductive cladding (6) surrounding the core (5). Moreover, the insulation element (1) comprises a cationic polymer (4).

20 Claims, 3 Drawing Sheets

(51) Int. Cl.
*H01B 3/47* (2006.01)
*H01B 3/48* (2006.01)
*H01B 3/52* (2006.01)
*H01B 3/54* (2006.01)
*C08L 3/04* (2006.01)
*C08L 79/02* (2006.01)
*H01B 3/20* (2006.01)
*H01F 27/32* (2006.01)

(52) U.S. Cl.
CPC ............ *H01B 3/303* (2013.01); *H01B 3/307* (2013.01); *H01B 3/47* (2013.01); *H01B 3/48* (2013.01); *H01B 3/52* (2013.01); *H01B 3/54* (2013.01); *C08L 2205/16* (2013.01); *H01F 27/32* (2013.01)

(56) References Cited

U.S. PATENT DOCUMENTS

| | | |
|---|---|---|
| 2013/0187099 A1 | 7/2013 | Luethen et al. |
| 2013/0244022 A1 | 9/2013 | Rueger et al. |
| 2014/0042355 A1* | 2/2014 | Tsu .......................... E04B 1/76 252/62 |
| 2014/0178661 A1* | 6/2014 | Adjei ...................... D21H 17/72 428/220 |
| 2015/0083353 A1* | 3/2015 | Kleemann .............. D21H 13/44 162/138 |
| 2015/0167189 A1* | 6/2015 | Pierce ........................ C25C 1/20 205/571 |
| 2015/0333648 A1* | 11/2015 | Son ............................ H02J 3/36 363/35 |
| 2016/0039985 A1 | 2/2016 | Heinrichsdorff et al. |

FOREIGN PATENT DOCUMENTS

| | | |
|---|---|---|
| DE | 10 2010 052 889 A1 | 6/2012 |
| EP | 0 953 680 A1 | 11/1999 |
| WO | 2008/119705 A1 | 10/2008 |
| WO | 2011/003635 A1 | 1/2011 |
| WO | 2012/003166 A1 | 1/2012 |
| WO | 2014/154478 A1 | 10/2014 |
| WO | 2016/131698 A1 | 8/2016 |

OTHER PUBLICATIONS

International Search Report for PCT/EP2017/068998 dated Sep. 13, 2017 (PCT/ISA/210).

* cited by examiner

INSULATION ELEMENT WITH ARTIFICIAL FIBRES FOR ELECTRICAL INSULATION IN THE HIGH VOLTAGE RANGE

CROSS REFERENCE TO RELATED APPLICATIONS

This application is a National Stage of International Application No. PCT/EP2017/068998 filed Jul. 27, 2017, claiming priority based on European Patent Application No. 16185233.0, filed Aug. 23, 2016.

TECHNICAL FIELD

The present invention relates to an insulation element having low electrical conductivity for electrical insulation of an electrotechnical component in the high-voltage range. The invention also relates to an electrotechnical component having such an insulation element and to a process for producing such an insulation element.

STATE OF THE ART

Insulation elements are an important constituent of electrotechnical components and especially transformers. The insulation elements serve to electrically insulate two electrical conductors that are at different potentials in the operation of the component from one another. In the insulation element itself, an electromagnetic field can become established as a result. In the insulation of transformer windings, insulation elements impregnated with transformer oil are often used in order thus to achieve efficient cooling of the windings.

For various reasons, it is desirable in many applications and especially in the case of HVDC rectifier transformers that the insulation elements are not completely insulating but have a precisely adjustable low conductivity. The conductivity of the insulation element can, for example, be matched to that of the transformer oil in order thus to improve the dielectric strength of the transformer insulation overall. By virtue of the insulation element actually having a higher conductivity than the transformer oil, the electrical field can be forced more into the insulation oil and hence excessively high local field strengths in the insulation element can be prevented. As a result, the burden on the solid-state insulation is reduced, or its dimensions can be smaller. Smaller dimensions, i.e. lower thickness, of the insulation element firstly means lower material consumption and hence lower costs in the production of the insulation element. On the other hand, the insulation element, as a result, also takes up less volume in the electrotechnical component, which means that it can likewise have smaller dimensions and be produced less expensively. According to the type and application of the electrotechnical component, in relation to the insulation elements used therein, certain conductivities are thus indeed desirable.

In order to have conditions that are as constant as possible in the operation of the electrotechnical component, i.e., for example, during the startup of a transformer as well, the electrical properties of the insulation element should as far as possible be temperature-independent. However, the electrical conductivity of most customary insulation elements is strongly temperature-dependent.

Document WO 2008/119705 A1 discloses an insulation element having a matrix of a polymer material. In order to achieve a certain electrical conductivity, electrically conductive particles are incorporated within the polymer material.

Especially in the case of transformers, insulation elements comprising a natural fibrous material, for example cellulose, and/or chemical fibers, for example aramid fibers, are frequently used. Natural fibrous materials consisting of chemical pulp have excellent dielectric properties and excellent dielectric strength. Moreover, insulation elements produced from chemical pulp are notable for their good impregnability with transformer oil. Chemical fibers, by contrast, especially in the case of prolonged use, are usually notable for better thermal stability.

A cellulose-based material in which a certain conductivity is achieved by means of incorporation of conductive particles is disclosed in EP 0 953 680 A1. However, the material produced according to this document, at at least 2.0 mS/cm, has much too high a conductivity for the insulation of many electrotechnical components and especially for transformer insulation.

DE 29 34 007 discloses a paper or paperboard product with a metallic filler incorporated therein. For many electrotechnical applications, the electrical conductivity of the paper or paperboard product specified in this document is therefore too significant.

DE 10 2010 041 630 A1 discloses a cellulose material-based transformer insulation, the specific resistance of which is matched to the resistance of the oil with the aid of semiconductive or nonconductive nanoparticles. For this purpose, the nanoparticles distributed within the cellulose material are coated with an electrically conductive polymer. However, the production of an insulation element according to the teaching of this document is found to be difficult and is associated with comparatively high costs since the nanoparticles, in the necessary dewatering of the cellulose material, are flushed out for the most part, and there is therefore a considerable loss of particles. Moreover, the insulation element has nonuniform electrical conductivity.

WO 2012/003166 discloses a multi-ply insulation element having two layers each including aramid fibers, and with an intervening layer of cellulose.

International application PCT/EP 2016/052887 to the same applicant, which was still unpublished on filing of the present application, discloses an insulation element for the high-voltage range in which electrically conductive particles are incorporated in a natural fibrous material that has not been subjected to further chemical processing, for example cellulose, in order to achieve a precisely adjustable conductivity of the insulation element. For this purpose, the particles have an electrically nonconductive core and an electrically conductive or semiconductive shell that surrounds the core. By virtue of the insulation element additionally including a cationic polymer, it is possible to achieve a particularly homogeneous distribution of conductivity.

SUMMARY OF THE INVENTION

It is thus an object of the present invention to provide an inexpensively producible insulation element for the electrical insulation of an electrotechnical component in the high-voltage range, which has a precisely adjustable, low and homogeneously distributed electrical conductivity.

In order to achieve this object, the present invention provides an insulation element having low electrical conductivity for electrical insulation of an electrotechnical component in the high-voltage range, comprising chemical fibers and electrically conductive particles with an electrically nonconductive core and an electrically conductive or semiconductive shell that surrounds the core. The insulation element also includes a cationic polymer.

The cationic polymer enables low electrical conductivity distributed homogeneously within the insulation element, especially a homogeneous distribution of low electrical conductivity across the thickness of the insulation element. For this purpose, the electrically conductive particles and/or the cationic polymer are preferably distributed homogeneously within the insulation element. Preferably, the homogeneous distribution exists across the thickness of the insulation element and advantageously across the entire insulation element.

Preferably, the insulation element is used for electrical insulation in the high-voltage range. It can alternatively be used for insulation at voltages below the high-voltage range. The high-voltage range typically includes AC voltages having an effective value of at least 1000 volts and DC voltages of at least 1500 volts. The insulation element is preferably designed such that it is electrically insulating at any desired voltages of at least 100 kV, and especially preferably of at least 350 kV.

Advantageously, the insulation element has been impregnated with oil, especially transformer oil. Especially advantageously, the chemical fibers have been impregnated with oil, especially transformer oil. The insulation element in that case includes oil, especially transformer oil, and is thus usable directly for a corresponding electrotechnical application. For many electrotechnical applications and especially for use in transformers and specifically in HVDC rectifier transformers, the insulation element impregnated with oil, especially transformer oil, preferably has an electrical conductivity of at least $1*10^{-17}$ S/m, more preferably of at least $1*10^{-15}$ S/m, even more preferably of at least $1*10^{-13}$ S/m, even more preferably of at least $1*10^{-10}$ S/m, most preferably of at least $1*10^{-9}$ S/m. Preferably, the maximum electrical conductivity is $1*10^{-7}$ S/m, more preferably $1*10^{-8}$ S/m. Electrical conductivity in oil is measured according to standard IEC 60093, second edition, 1 Jan. 1980. The measurement is evaluated by what is called the Kuechler method (A. Kuechler; Hochspannungstechnik Grundlagen—Technologie—Anwendungen [High-Voltage Technology Basics—Technology—Applications]; 3rd edition, 2009, ISBN 978-3-540-78412-8; chapter 4.2.2.3). The use of the electrically conductive particles with an electrically nonconductive core and an electrically conductive or semiconductive shell that surrounds the core means that the electrical conductivity of the insulation element is adjustable precisely and especially to these advantageous values.

The insulation element may have one or more plies, each of which includes the chemical fibers and the electrically conductive particles and the cationic polymer. The individual plies are advantageously bonded to one another. If the insulation element has at least two plies, the electrically conductive particles and/or the cationic polymer are preferably distributed homogeneously in at least one ply, preferably in each ply. Preferably, the homogeneous distribution exists across the thickness of at least one ply, preferably across the thickness of each ply.

Preferably, in the production of the insulation element, a sufficient amount of cationic polymer is used that the cationic polymer, based on the total weight of the insulation element in the dry state, accounts for 0.1-15% by weight, preferably 1-15% by weight, more preferably 2-15% by weight, even more preferably 3-15% by weight, most preferably 4-15% by weight. This results in particularly good producibility of the insulation element in the case of use of the stated amounts of cationic polymer.

In the context of this invention, in relation to the insulation element, the expression "in the dry state" is understood to mean that the insulation element includes 1% by weight or less of water, based on the total weight of the insulation element. The measurement of the water content is conducted by means of standard IEC 60814, 2nd edition, 29 Aug. 1997. For the water measurement, a Metrohm 774 sample oven combined with an 831 KF coulometer is used.

Preferably, the electrically conductive particles account for 1-30% by weight, preferably 4-30% by weight, more preferably 6-30% by weight, even more preferably 8-30% by weight, even more preferably 11-30% by weight, even more preferably 12-30% by weight, even more preferably 12-28% by weight, even more preferably 12-26% by weight, most preferably 18-26% by weight, of the total weight of the insulation element in the dry state. These amounts of particles permit defined setting of the electrical conductivity in oil, especially within the ranges from $1*10^{-17}$ S/m to $1*10^{-8}$ S/m, $1*10^{-16}$ S/m to $1*10^{-8}$ S/m, $1*10^{-15}$ S/m to $1*10^{-8}$ S/m, $1*10^{-19}$ S/m to $1*10^{-8}$ S/m, $1*10^{-10}$ S/m to $1*10^{-8}$ S/m and $1*10^{-9}$ S/m to $1*10^{-8}$ S/m, which is important particularly in transformer applications. Given at least 11% by weight, especially at least 12% by weight, of electrically conductive particles, it is mainly the electrically conductive particles and no longer the chemical fibers that are crucial for electrical conductivity, which can be explained by the percolation effect of the particles. The electrical conductivity of the insulation element can then be adjusted precisely with the aid of a corresponding choice of particles and is essentially independent of the particle concentration. Over and above this particle dosage, the electrical conductivity of the insulation element is additionally largely temperature-independent. When the particle concentration is within a range of 11-30% by weight, preferably within a range of 12-30% by weight, more preferably within a range of 12-28% by weight, even more preferably within a range of 12-26% by weight, most preferably within a range of 18-26% by weight, based on the total weight of the insulation element in the dry state, it is possible to achieve a clearly defined electrical conductivity of the insulation element which is largely independent of the particle concentration and temperature with minimum particle expenditure. When the particle concentration is within a range of 11-30% by weight, preferably within a range of 12-30% by weight, more preferably within a range of 12-28% by weight, even more preferably within a range of 12-26% by weight, most preferably within a range of 18-26% by weight, based on the total weight of the insulation element in the dry state, and the cationic polymer, based on the total weight of the insulation element in the dry state, is within a range of 2-5% by weight, preferably within a range of 2-4% by weight, even more preferably within a range of 3-4% by weight, particularly good achievement of a clearly defined electrical conductivity of the insulation element which is largely independent of the particle concentration and temperature with minimum particle expenditure is possible. Since the particles are typically a particularly costly constituent of the insulation element, it is possible in this way to reduce the overall costs of the insulation element.

An optimal percolation effect can be observed when the electrically conductive particles are in platelet form. The necessary amount of electrically conductive particles in the insulation element can thus be lowered by means of a configuration of the particles in platelet form.

The term 'chemical fibers' is a collective term for fibers that have been produced industrially, especially produced industrially by chemical methods. Chemical fibers include fibers produced from natural polymers, fibers produced from synthetic polymers and inorganic chemical fibers. The fibers produced from natural polymers are, for example, polylactide fibers. The fibers produced from natural polymers may, for example, also be based on cellulose and in that case are, for example, regenerate fibers or cellulose ester fibers. Regenerate fibers are, for example, viscose, modal, lyocell and cupro. Cellulose ester fibers are, for example, cellulose acetate fibers or cellulose triacetate fibers. Fibers produced from synthetic polymers are generally obtained from mineral oil or coal. Chemical fibers produced from synthetic polymers are, for example, polyamide fibers, polyester fibers, polyurethane fibers, polyvinyl fibers, polyolefin fibers, fluoro fibers, polyethersulfone fibers, polyacrylonitrile fibers, melamine resin fibers or aramid fibers. Polyolefin fibers are, for example, polyethylene fibers or polypropylene fibers. Aramid fibers are, for example, meta-aramid fibers or para-aramid fibers. Inorganic chemical fibers are, for example, glass fibers or ceramic fibers.

Advantageously, the chemical fibers account for at least 10% by weight, more advantageously at least 20% by weight, more advantageously at least 40% by weight, more advantageously at least 60% by weight, more advantageously at least 80% by weight, most advantageously 90% by weight, based on the total weight of the insulation element in the dry state. In this way, the insulation element is producible less expensively and has good impregnability with transformer oil. A high proportion of chemical fibers, in particular of synthetic fibers such as for example aramid fibers, leads to better thermal stability of the insulation element, especially in prolonged use. The operating life of the insulation element can be increased as a result.

The electrically conductive or semiconductive shell advantageously completely surrounds the core of each particle. It is advantageously based on an inorganic material. The shell of the electrically conductive particles preferably contains a metal, more preferably a metal oxide. Particles comprising a metal-containing shell, especially a shell containing a metal oxide, allow better-definable adjustment of the electrical conductivity in the insulation element. Moreover, such a particle is more easily producible and more stable. The metal oxide may, for example, be tin oxide, zinc oxide, antimony oxide, titanium dioxide, zirconium dioxide, indium dioxide, silicon dioxide or, for example, a mixture of the individual metal oxides mentioned. Preferably, the metal oxide has been doped with an extraneous atom. By means of a suitable choice and dosage of the extraneous atom, it is possible to match the conductivity of the insulation element exactly to a desired value. Useful doping atoms include, for example, gallium, aluminum, indium, thallium, germanium, tin, phosphorus, arsenic, antimony, selenium, tellurium and/or fluorine.

The size of the electrically conductive particles is advantageously not more than 200 µm (micrometers), more advantageously not more than 100 µm, and even more advantageously not more than 60 µm. Preferably, the particle size is additionally at least 2 µm. It has been found that, with particles in these size ranges in combination with the cationic polymer, the electrical conductivity can be set particularly accurately. Preferably, the thickness of the electrically conductive particles, especially if the electrically conductive particles are particles in platelet form, is in the range from 0.3 to 4 µm, especially in the range from 0.5 to 3 µm.

The particle size and particle size distribution can be ascertained by various methods customary in the art. However, preference is given in accordance with the invention to using the laser diffraction method in a standard method by means of a Malvern Mastersizer 2000, APA 2000 (product from Malvern Instruments Ltd., UK). This process has the advantage that particle size and particle size distribution can be determined simultaneously under standard conditions.

The particle size and thickness of individual particles can also be ascertained with the aid of SEM (scanning electron microscope) images. In these, particle size and geometric particle thickness can be ascertained by a direct measurement. To ascertain average values, at least 1000 particles are evaluated individually and the results are averaged.

The core of the electrically conductive particles is advantageously a mineral material. The core preferably includes a natural or synthetic mica. The core may alternatively include calcium carbonate, chalk, talc, bentonite, kaolin, glass, titanium oxide, silicon dioxide ($SiO_2$), sericite or aluminum oxide ($Al_2O_3$). Electrically conductive particles comprising mica have higher stability and better coatability.

In an especially preferred embodiment, the electrically conductive particles are the product from Merck, Darmstadt, having the Minatec® 51 CM trade name and/or the product from Merck, Darmstadt, having the Minatec® 31 CM trade name. The electrically conductive particles may also comprise the products from Merck, Darmstadt, having the Minatec® 40 CM, Minatec® 60 CM or Minatec® 42 CM trade name.

The cationic polymer used is preferably polyethyleneimine (PEI) and/or cationic starch. The cationic polymer may alternatively be polyacrylamide (PAM), polydiallyldimethylammonium chloride (PDADMAC), polyvinyl alcohol, polyester epoxy resin, polyvinylamine (PVAm), polyethylene oxide (PEO), dicyandiamide-formaldehyde (DCD), polyamidoamine (PAMAM), polyaminoamide-epichlorohydrin (PAE) or polyamide epoxy resin.

In the context of this invention, in relation to the chemical fibers, the expression "in the dry state" is understood to mean that the chemical fibers include 1% by weight or less of water, based on the total content of the chemical fibers, i.e. of the fibrous material. The measurement of the water content is conducted by means of standard ISO 4119, second edition, Jan. 6, 1995.

The insulation element may, as well as the chemical fibers, additionally also contain any number of further materials. For instance, as well as the chemical fibers, the insulation element may, for example, also include nonfibrous materials such as polyester resin, amylose, amylopectin, starch, algin, pectin, carrageenan, carob seed flour, xanthan, guaran, agar, furcellaran, carboxymethyl cellulose (CMC) and/or tamarind extract. It will be appreciated that, as well as the chemical fibers, it is additionally also possible for a natural fibrous material which is obtained from wood and/or annual plants, especially cotton, to be included in the insulation element. The natural fibrous material may be pulp, especially cellulose. Alternatively or additionally, the natural fibrous material may also be based on abaca, jute, hemp, sisal and/or used paper.

The insulation element is preferably in the form of paper, card or paperboard.

The invention also relates to an electrotechnical component for the high-voltage range comprising an insulation element designed as stated. The electrotechnical component may especially be a transformer, such as an HVDC rectifier transformer.

The present invention additionally provides a process for producing an insulation element designed as stated. The process has at least the process steps of:

mixing the chemical fibers with electrically conductive particles that have an electrically nonconductive core and an electrically conductive or semiconductive shell that surrounds the core; and dewatering the chemical fibers mixed with the electrically conductive particles.

The process also has the process step that a cationic polymer is added to the chemical fibers prior to the dewatering. The addition of the cationic polymer can be conducted before, after or with the mixing of the chemical fibers with the electrically conductive particles.

BRIEF DESCRIPTION OF THE DRAWINGS

Preferred embodiments of the invention are described hereinafter with reference to the drawings, which serve merely for elucidation and should not be interpreted in a restrictive manner. The drawings show.

DESCRIPTION OF PREFERRED EMBODIMENTS

Figure 1:
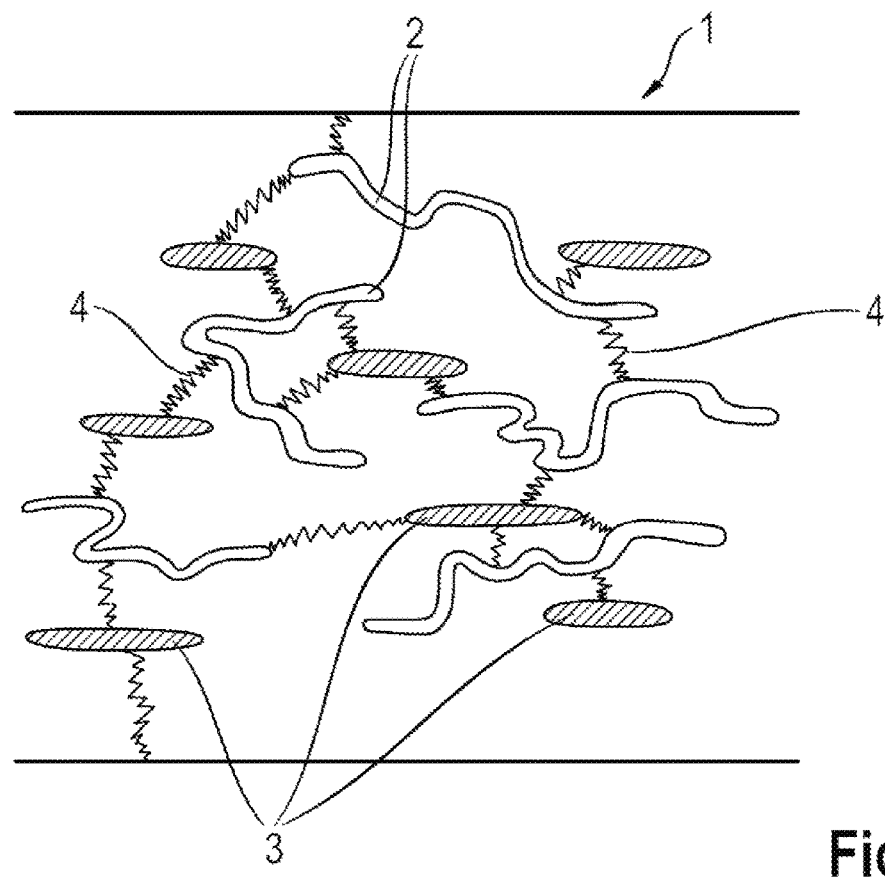
FIG. 1 a schematic cross-sectional view of a first insulation element of the invention, with a comparatively small dosage of electrically conductive particles.
Figure 2:
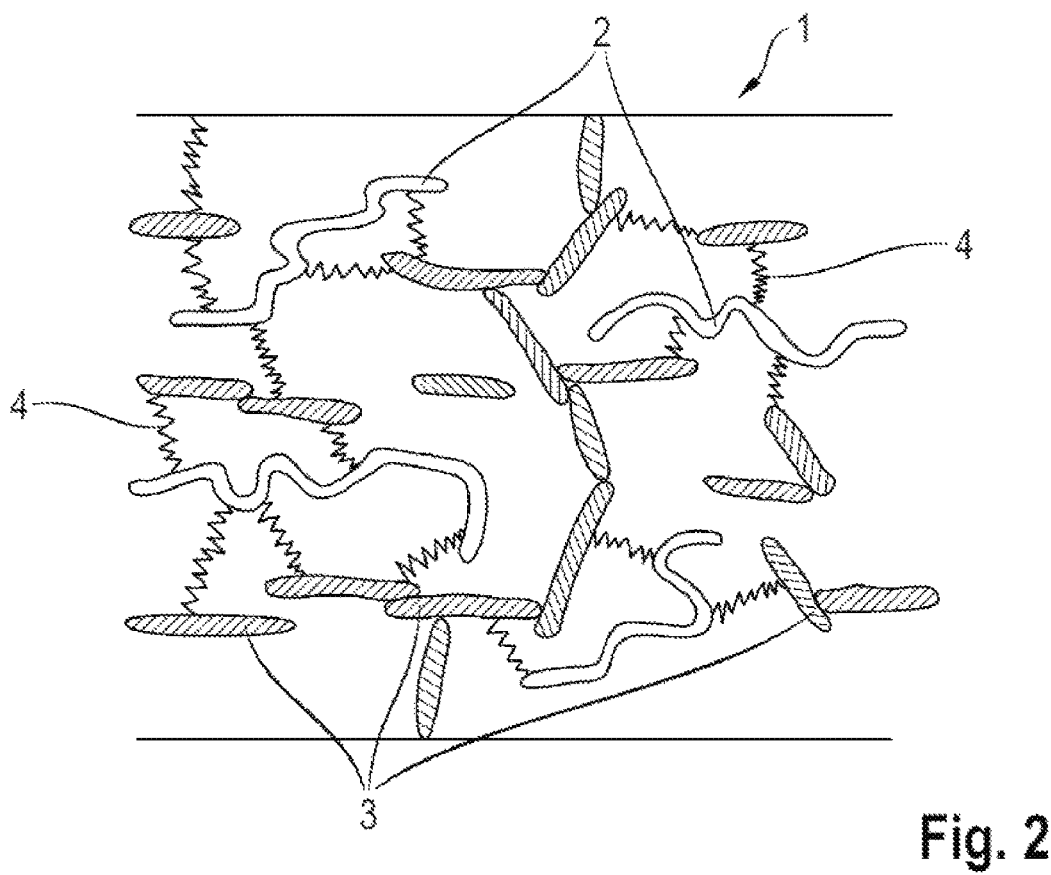
FIG. 2 a schematic cross-sectional view of a second insulation element of the invention, with an elevated dosage of electrically conductive particles compared to FIG. 1.

In the following, a process for producing a preferred embodiment of an inventive insulation element 1 for electrical insulation of an electrotechnical component in the high-voltage range is indicated. FIGS. 1 and 2 show schematic cross-sectional views of such insulation elements 1, each with a different dosage of electrically conductive particles 3.

For the production of the inventive insulation element of this embodiment, chemical fibers 2 are used. Chemical fibers used may, for example, be para-aramid fibers, for example Twaron® 1094 from Teijin (Kasinostrasse 19-21, 42103 Wuppertal, Germany). The chemical fibers 2 may be ground, such that they are in a ground form for the further processing. They have a dewatering resistance of 5 SR (Schopper-Riegler) to 80 SR. The average length-weighted fiber length of the starting material, i.e. of the chemical fibers 2, is preferably in a range between 0.3 mm and 6.0 mm, but more preferably in a range between 0.3 mm and 2.2 mm. Dewatering resistance is determined according to standard ISO 5267-1, second edition, Jan. 3, 1999. Fiber length is determined to standard TAPPI T271, pm-91, 1991.

The ground chemical fibers 2 are suspended in water. An additive in the form of a cationic polymer 4, for example a cationic starch, a cationic polyethyleneimine, cationic polyacrylamide, cationic polydiallyldimethylammonium chloride (polyDADMAC) or a cationic polyvinyl alcohol, is added to the chemical fibers 2 suspended in water. The dosage of the additive should take place primarily at a consistency of 0.01% to 10% by weight, better at 0.1-10% by weight, but at best at 0.5% to 1.0% by weight. The cationic polymer 4 enables achievement of a homogeneous distribution of low electrical conductivity within the insulation element 1.

In the preferred embodiment, a cationic starch (ROQUETTE FRERES, 62080 LESTREM, France, VECTOR® SC 20157) is used in an amount corresponding to a proportion of at least 0.2%, more preferably of at least 0.5%, even more preferably of at least 1.0%, dry matter based on the total weight of the insulation element 1 in the dry state. Preferably, the cationic starch is used in an amount corresponding to a maximum proportion of 8% by weight, more preferably to a maximum proportion of 10% by weight, even more preferably to a maximum proportion of 15% by weight, dry matter based on the total weight of the insulation element 1 in the dry state.

Later on in the production process, electrically conductive particles 3 having an electrically nonconductive core and an electrically conductive or semiconductive shell that surrounds the core are added to the suspension of chemical fibers 2 and cationic polymer. The electrically nonconductive core of these particles 3 is a mineral filler, for example calcium carbonate, chalk, talc, bentonite, kaolin, titanium dioxide or, especially preferably, mica. The conductive or semiconductive shell layer preferably includes an oxide of tin, zinc, indium, titanium, zirconium, silicon and/or antimony. The shell layer preferably accounts for 20-60% by weight of the total mass of a single conductive particle 3. The mineral filler of the particle 3 accordingly has a proportion by weight of 40-80% by weight based on the total mass of the conductive particle 3.

The size of the conductive particles 3 is 2-200 μm, but preferably 100 μm or less, more preferably even 60 μm or less, but advantageously at least 2 μm. The mineral filler itself preferably has an ash content of 99.5%. The particle size and particle size distribution can be determined by various methods customary in the art. However, preference is given in accordance with the invention to using the laser diffraction method in the standard method by means of a Malvern Mastersizer 2000, APA2000 (product from Malvern Instruments Ltd., UK). This process has the advantage that particle size and particle size distribution can be determined simultaneously under standard conditions.

The particle size and the thickness of individual particles can also be ascertained with the aid of SEM (scanning electron microscope) images. In these, particle size and geometric particle thickness can be ascertained via direct measurement. To ascertain average values, at least 1000 particles are evaluated individually and the results are averaged.

Figure 3A:
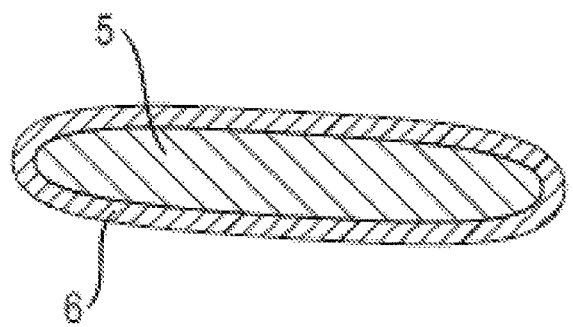
FIG. 3 a, b, c schematic cross-sectional views of electrically conductive particles.

In the preferred embodiment, the conductive particles 3 are formed by the Minatec® 31 CM (FIG. 3a) or Minatec® 51 CM (FIG. 3a) product from Merck, Darmstadt. In the case of Minatec® 31 CM, the conductive particles 3 have a particle size in the range from 2 μm to 15 μm. In the case of Minatec® 51 CM, the conductive particles 3 have a particle size in the range from 10 μm to 60 μm. The proportion of the shell layer 6 consisting of antimony oxide is 38-54% by weight in the case of Minatec® 31 CM and 21-36% by weight in the case of Minatec® 51 CM, and hence that of the nonconductive core 5 consisting of mica is 46-62% by weight in the case of Minatec® 31 CM and 64-79% by weight by weight in the case of Minatec® 51 CM.

Figure 3B:
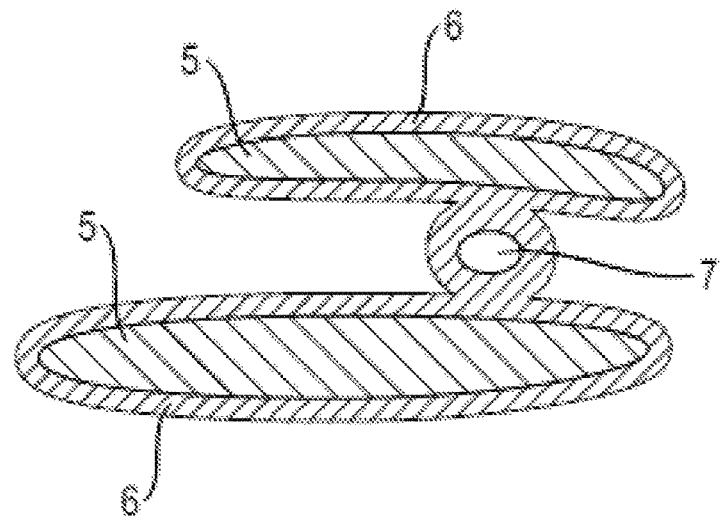
Figure 3C:
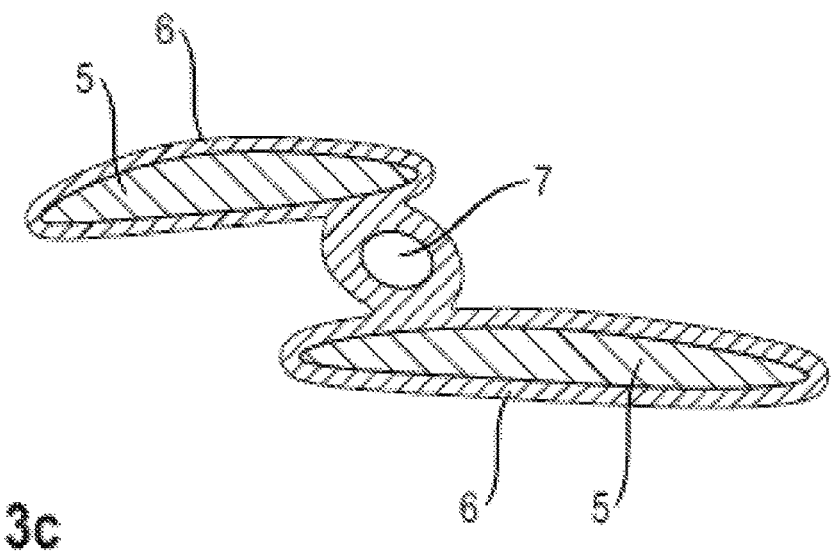

Alternatively or additionally, it is possible to use conductive particles 3 each having two mica particles having a conductive layer, especially shell layer 6, and additionally bonded to one another via a quartz or talc particle 7. The conductive layer 6 of these particles 3 ideally includes an oxide of antimony. The electrically conductive particles of the products from Merck, Darmstadt, having the Minatec® 40 CM (FIG. 3b) and Minatec® 60 CM (FIG. 3b) trade names have a quartz particle 7. The electrically conductive particles of the product from Merck, Darmstadt, having the Minatec® 42 CM trade name (FIG. 3c) contain a talc particle 7.

In a further production step, the chemical fibers 2 that have been suspended in water and mixed with the cationic polymer 4 and the electrically conductive particles 3 are dewatered with the aid of a screen. In a subsequent pressing operation, the water still retained in the chemical fibers 2 is separated out.

The dewatering of the suspension, the solid-state component of which has a proportion of 60-94% of the chemical fibers 2, a proportion of 1.0-4.0% of the cationic polymer 4 and a proportion of 5.0-39.0% of the electrically conductive particles 3, forms a single-ply structure. The insulation element 1 is ultimately formed preferably from fewer than 10, more preferably from fewer than 8, and most preferably from one to seven of these individual plies. These plies may be formed by the winding operation on a making roll up to a thickness, based on the wet state at a water content of 50-90%, of 50 mm to give a thick card or paperboard.

During the dewatering operation, the fiber material is dewatered not just by means of pressure but also by means of thermal heating to 50 to 160° C.

After the dewatering, the fiber material 2 that has been mixed with a cationic polymer 4 and with conductive particles 3 is in the form of paper, card or paperboard and preferably has a basis weight of 10 g/m²-12 000 g/m². The card preferably has a basis weight of 225 to less than 600 g/m². The paperboard preferably has a basis weight of 600-12 000 g/m². The paper preferably has a basis weight of less than 225 g/m².

In a further production step, the two-dimensional dewatered fiber material 2 may be bonded with an adhesive in order thus to achieve a thickness of up to 500 mm. The adhesive may be based, for example, on a polyester resin, a casein or a micro- or nanoscale cellulose. It is likewise possible to convert the fiber material 2 that has been mixed with electrically conductive particles 3 and the cationic polymer 4 to any three-dimensionally structured form in the pressing operation, and to thermally dry it after this shaping operation.

Figure 4:
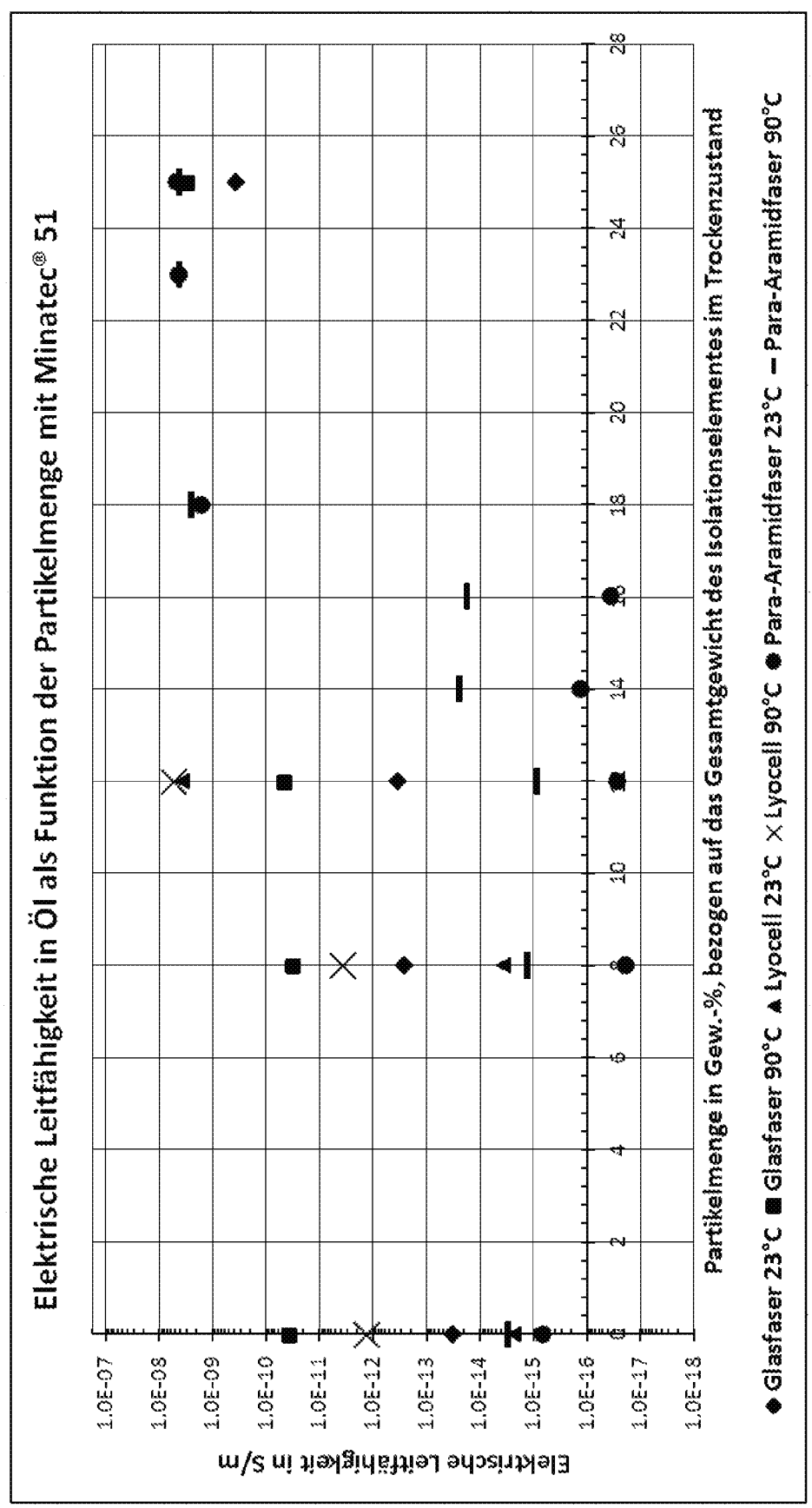
FIG. 4 a graph that shows the relationship between the electrical conductivity of an insulation element of the invention and its content of electrically conductive particles.

The amount of electrically conductive particles 3 is chosen such that there is a content in the dewatered insulation element 1 of 1-30% by weight, preferably 4-30% by weight, more preferably 6-30% by weight, even more preferably 8-30% by weight, even more preferably 11-30% by weight, even more preferably 12-30% by weight, even more preferably 12-28% by weight, even more preferably 12-26% by weight, most preferably 18-26% by weight, of the total weight of the insulation element in the dry state. The upper amount of electrically conductive particles 3 in the stated ranges is not 30% by weight, but preferably 28% by weight, more preferably 26% by weight. These amounts of particles permit defined setting of the electrical conductivity in oil especially within the ranges of $1*10^{-17}$ S/m to $1*10^{-8}$ S/m, $1*10^{-16}$ S/m to $1*10^{-8}$ S/m, $1*10^{-15}$ S/m to $1*10^{-8}$ S/m, $1*10^{-13}$ S/m to $1*10^{-8}$ S/m, $1*10^{-10}$ S/m to $1*10^{-8}$ S/m and $1*10^{-9}$ S/m to $1*10^{-8}$ S/m, which are important particularly in transformer applications. Experiments having the results shown in FIG. 4 showed that the electrical conductivity in oil of insulation element 1 with less than 12% by weight of particles 3 is barely increased by comparison with the case without electrically conductive particles 3. Over and above a content of electrically conductive particles 3 of about 8% by weight and up to a content of about 18% by weight, there is a rise in the electrical conductivity of the dry and oil-impregnated insulation element 1 from a value in the range between $1*10^{-17}$ S/m and $1*10^{-10}$ S/m up to a value in the range between $1*10^{-10}$ S/m and $1*10^{-8}$ S/m, especially up to a value in the range between $1*10^{-9}$ S/m and $1*10^{-8}$ S/m. In the case of a further increase in the concentration of electrically conductive particles 3 in the insulation element 1 to at least 20% by weight, especially to at least 24% by weight, the electrical conductivity of the insulation element 1 remains constant within the range between $1*10^{-10}$ S/m and $1*10^{-8}$ S/m, especially $1*10^{-9}$ S/m and $1*10^{-8}$ S/m. The electrical conductivities in oil shown in FIG. 4 were measured using the insulation element 1, in the form firstly of paper and secondly of paperboard. In the case of paper and also of paperboard, the electrical conductivities in oil were each measured according to standard IEC 60093, 2nd edition, 1 Jan. 1980 and at the temperatures of 23° C. and 90° C. The measurement was evaluated by what is called the Kuechler method (A. Kuechler; Hochspannungstechnik Grundlagen—Technologie—Anwendungen; 3rd edition, 2009, ISBN 978-3-540-78412-8; chapter 4.2.2.3).

The effect that the conductivity is barely affected by very small amounts of particles and only rises over and above a certain particle concentration in order then to assume a roughly constant value over and above a particular particle concentration can be explained particularly with reference to FIGS. 1 and 2:

At a very low concentration of electrically conductive particles 3 in the insulation element 1 as shown in FIG. 1, the particles 3 are incorporated homogeneously between the individual chemical fibers 2 and are barely in contact with one another. The crucial factor for the electrical conductivity of the insulation element 1 in that case is thus the chemical fibers 2, such that, according to the nature of the chemical fibers 2, a different electrical conductivity is measured. The electrical conductivity of the insulation element 1 thus corresponds roughly to the case of a corresponding insulation element 1 without electrically conductive particles 3.

Over and above a certain concentration of electrically conductive particles 3 of about 8% by weight, the particles 3 begin to come into mutual contact (FIG. 2). As a result, the electrical conductivity of the insulation element 1 is increasingly affected by the particles 3. Over and above a certain concentration, the particles 3 form a multitude of chains of particles 3 in mutual contact, which extend from the upper face of the insulation element 1 to its lower face. A percolation effect thus takes place. In that case, a further increase in the particle concentration no longer leads to a further increase in the electrical conductivity of the insulation element 1; instead, a kind of saturation state has been attained.

In order to achieve, with a minimum amount of particles, an electrical conductivity of the insulation element 1 desirable for many applications in the range between $1*10^{-17}$ S/m and $1*10^{-8}$ S/m, especially in the range between $1*10^{-10}$ S/m and $1*10^{-8}$, especially in the range between $1*10^{-9}$ S/m and $1*10^{-8}$, a particle concentration of 1% by weight to 30% by weight, preferably 4% by weight to 30% by weight, more preferably 6% by weight, more preferably 8% by weight to 30% by weight, even more preferably 11% by weight to 30% by weight, even more preferably 12-30% by weight, even more preferably 12-28% by weight, even more preferably 12-26% by weight, most preferably 18% by weight to 26% by weight, should thus be chosen.

Surprisingly, it has additionally been found in the experiments conducted that the electrical conductivity of the insulation element 1 is largely temperature-independent over and above a particle concentration of more than about 12% by weight, especially of at least about 18% by weight. This too can be explained in that, over and above this particle concentration, it is mainly the particles 3 and no longer the chemical fibers 2, which are more significantly affected by the temperature, that are crucial for the electrical conductivity of the insulation element 1. Accordingly, the electrical conductivity of the insulation element 1, over and above these particle concentrations, also becomes largely independent of the nature of the chemical fibers 2 used.

An especially preferred embodiment of an insulation element 1 has the following composition, based in each case on the total weight of the insulation element 1 in the dry state:

8-18% by weight of Minatec® 51 CM;
1-4% by weight of cationic polymer 4;
0.5-1% by weight of water; and
77.0-90.5% by weight of chemical fibers 2.

It will be appreciated that the invention described here is not restricted to the embodiments mentioned and a multitude of modifications is possible. The insulation element 1 need not necessarily, for example, be a constituent of a transformer. The insulation element 1 can also be used for insulation of other electrotechnical components, for example compensation inductors or phase shifters. In addition, a transformer need not necessarily be an oil-filled transformer. The inventive insulation element 1 could of course also be used, for example, in gas-insulated transformers. A multitude of further modifications is conceivable.

The invention claimed is:

1. An insulation element comprising:
chemical fibers comprising fibers produced from synthetic polymers and/or comprising inorganic chemical fibers;
electrically conductive particles having an electrically nonconductive core and an electrically conductive or semiconductive shell that surrounds the core; and
a cationic polymer,
wherein said insulation element is in the form of at least one ply of paper, card or paper board,
wherein said fibers, electrically conductive particles and cationic polymer in at least one ply are homogeneously distributed, and
wherein said insulation element has low electrical conductivity for electrical insulation of an electrotechnical component operable in a high-voltage range.

2. The insulation element as claimed in claim 1, wherein the cationic polymer accounts for 0.1-15% by weight based on the total weight of the insulation element in the dry state.

3. The insulation element as claimed in claim 1, wherein the electrically conductive particles account for 1-30% by weight based on the total weight of the insulation element in the dry state.

4. The insulation element as claimed in claim 1, wherein the chemical fibers account for at least 60% by weight based on the total weight of the insulation element in the dry state.

5. The insulation element as claimed in claim 1, wherein the shell of the electrically conductive particles comprises a metal.

6. The insulation element as claimed in claim 5, wherein the shell contains a metal oxide.

7. The insulation element as claimed in claim 1, wherein the size of the electrically conductive particles is in the range from 2 um to 200 um.

8. The insulation element as claimed in claim 1, wherein the core of the electrically conductive particles includes a natural or synthetic mica.

9. The insulation element as claimed in claim 8, wherein the electrically conductive particles are particles having a particle size in the range from 2 um to 15 um and having a proportion of the shell layer consisting of antimony oxide of 38-54% by weight and having a proportion of mica in the nonconductive core of 46-62% by weight, and/or are particles having a particle size in the range from 10 um to 50 um and having a proportion of the shell layer consisting of antimony oxide of 21-36% by weight and having a proportion of mica in the nonconductive core of 64-79% by weight.

10. The insulation element as claimed in claim 1, wherein the cationic polymer is polyethyleneimine or cationic starch.

11. The insulation element as claimed in claim 1, wherein the chemical fibers are para-aramid fibers.

12. The insulation element as claimed in claim 1, wherein the chemical fibers have been impregnated with oil, and wherein the insulation element has an electrical conductivity of $1*10^{-17}$ S/m to $1*10^{-8}$ S/m.

13. An electrotechnical combination comprising:
(1) an electrotechnical component for the high-voltage range, and
(2) an insulation element having low electrical conductivity for electrical insulation of the electrotechnical component, the insulation element comprising:
chemical fibers comprising fibers produced from synthetic polymers and/or comprising inorganic chemical fibers;
electrically conductive particles having an electrically nonconductive core and an electrically conductive or semiconductive shell that surrounds the core; and
a cationic polymer,
wherein said insulation element is in the form of at least one ply of paper, card or paper board,
wherein said fibers, electrically conductive particles and cationic polymer in at least one ply are homogeneously distributed.

14. The electrotechnical component as claimed in claim 13, wherein the electrotechnical component is a transformer.

15. A process comprising the following process steps:
mixing chemical fibers with electrically conductive particles that have an electrically nonconductive core and an electrically conductive or semiconductive shell that surrounds the core, wherein the chemical fibers comprise fibers produced from synthetic polymers and/or inorganic chemical fibers;
adding a cationic polymer to the chemical fibers; and
dewatering the chemical fibers mixed with the electrically conductive particles and the cationic polymer,
thereby producing an insulation element that has low electrical conductivity for electrical insulation of an electrotechnical component operable in a high-voltage range.

16. The insulation element as claimed in claim 6, wherein the metal oxide which has been doped with an extraneous atom.

17. The electrotechnical component as claimed in claim 14, wherein the electrotechnical component is an HVDC rectifier transformer.

18. The insulation element as claimed in claim 1, wherein the nonconductive core is made of a mineral material and the electrically conductive or semiconductive shell contains a metal.

19. The electrotechnical component as claimed in claim 13, wherein the nonconductive core is made of a mineral material and the electrically conductive or semiconductive shell contains a metal.

20. The process as claimed in claim 15, wherein the nonconductive core is made of a mineral material and the electrically conductive or semiconductive shell contains a metal.

* * * * *